(12) United States Patent
Shimada

(10) Patent No.: US 11,512,829 B2
(45) Date of Patent: *Nov. 29, 2022

(54) IN-VEHICLE HEADLIGHT AND LIGHT PROJECTION METHOD

(71) Applicant: MAXELL, LTD., Kyoto (JP)

(72) Inventor: Kenichi Shimada, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,479

(22) Filed: Jun. 23, 2022

(65) Prior Publication Data

US 2022/0333756 A1    Oct. 20, 2022

Related U.S. Application Data

(63) Continuation of application No. 17/406,728, filed on Aug. 19, 2021, now Pat. No. 11,448,379, which is a
(Continued)

(51) Int. Cl.
*F21S 41/64* (2018.01)
*F21S 41/25* (2018.01)
(Continued)

(52) U.S. Cl.
CPC ............ *F21S 41/64* (2018.01); *B60Q 1/0023* (2013.01); *B60Q 1/14* (2013.01); *F21S 41/16* (2018.01);
(Continued)

(58) Field of Classification Search
CPC ........... F21S 41/176; F21S 41/16; F21S 41/25
See application file for complete search history.

(56) References Cited

U.S. PATENT DOCUMENTS

2009/0231874 A1    9/2009   Kishimoto et al.
2011/0216550 A1    9/2011   Koike et al.
(Continued)

FOREIGN PATENT DOCUMENTS

JP    2007-323858 A    12/2007
JP    2009-224053 A    10/2009
(Continued)

OTHER PUBLICATIONS

Japanese Notice of Reasons for Refusal issued in corresponding Japanese Patent Application No. 2019-508388 dated Feb. 2, 2021, with English translation.
(Continued)

*Primary Examiner* — Eric T Eide
(74) *Attorney, Agent, or Firm* — McDermott Will & Emery LLP

(57) ABSTRACT

Reliability of an in-vehicle headlight is improved by changing a light distribution pattern without using any mechanical configuration. The in-vehicle headlight includes a laser light source, a spatial light modulator, a spatial-light-modulator controller, and a projection lens. The laser light source emits a laser light beam. The spatial light modulator modulates a phase distribution of the laser light beam emitted by the laser light source. The spatial-light-modulator controller is provided in a headlight controller, and controls the spatial light modulator. The spatial-light-modulator controller controls the spatial light modulator so as to modulate the phase distribution of the laser light beam, and changes the light distribution pattern projected from the projection lens.

8 Claims, 15 Drawing Sheets

Related U.S. Application Data continuation of application No. 16/498,250, filed as application No. PCT/JP2017/012661 on Mar. 28, 2017, now Pat. No. 11,118,750.

(51) Int. Cl.
- *F21S 41/176* (2018.01)
- *F21S 41/16* (2018.01)
- *B60Q 1/00* (2006.01)
- *B60Q 1/14* (2006.01)

(52) U.S. Cl.
CPC .............. *F21S 41/176* (2018.01); *F21S 41/25* (2018.01); *B60Q 2300/054* (2013.01); *B60Q 2300/41* (2013.01); *B60Q 2300/42* (2013.01); *B60Q 2300/45* (2013.01)

(56) References Cited

U.S. PATENT DOCUMENTS

| | | |
|---|---|---|
| 2011/0249460 A1 | 10/2011 | Kushimoto |
| 2012/0212933 A1 | 8/2012 | Toko |
| 2015/0009695 A1 | 1/2015 | Christmas et al. |
| 2015/0185523 A1 | 7/2015 | Matsumoto et al. |
| 2015/0345729 A1 | 12/2015 | Liao et al. |
| 2015/0375672 A1 | 12/2015 | Takahashi |
| 2017/0113599 A1 | 4/2017 | Park et al. |
| 2018/0245762 A1 | 8/2018 | Erdl et al. |

FOREIGN PATENT DOCUMENTS

| | | |
|---|---|---|
| JP | 2010-095048 A | 4/2010 |
| JP | 2011-198560 A | 10/2011 |
| JP | 2011-222238 A | 11/2011 |
| JP | 2012-058481 A | 3/2012 |
| JP | 2012-174520 A | 9/2012 |
| JP | 2014-026083 A | 2/2014 |
| JP | 2015-228306 A | 12/2015 |
| JP | 2016-011039 A | 1/2016 |

OTHER PUBLICATIONS

Non-Final Rejection issued in corresponding U.S. Appl. No. 16/498,250 dated Jun. 8, 2020.
Final Rejection issued in corresponding U.S. Appl. No. 16/498,250 dated Jan. 13 2021.
Notice of Allowance issued in corresponding U.S. Appl. No. 16/498,250 dated May 4, 2021.
Notice of Allowance issued in corresponding U.S. Appl. No. 17/406,728 dated Mar. 24, 2022.
International Search Report issued in corresponding International Patent Application No. PCT/JP2017/012661, dated Jun. 13, 2017, with English translation.

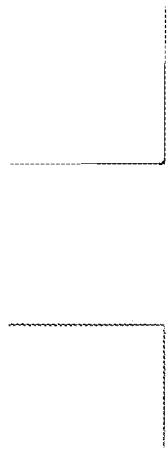
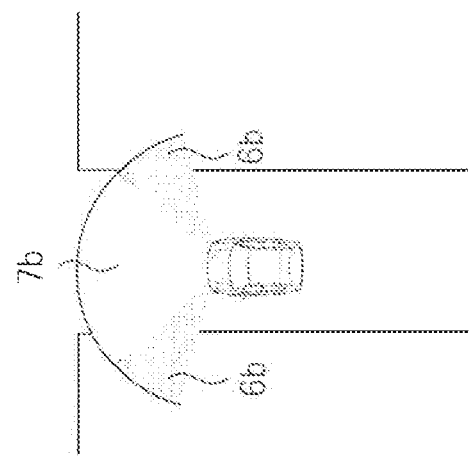
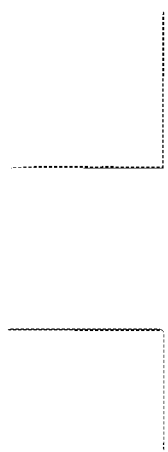
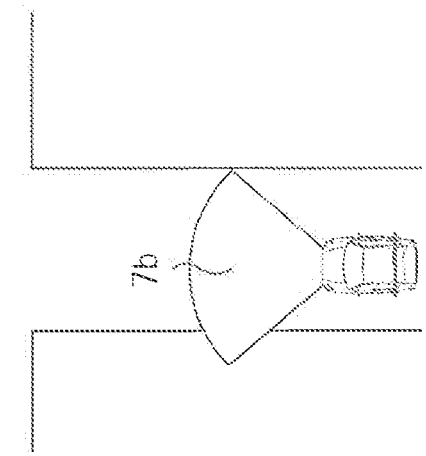
FIG. 12A
FIG. 12B

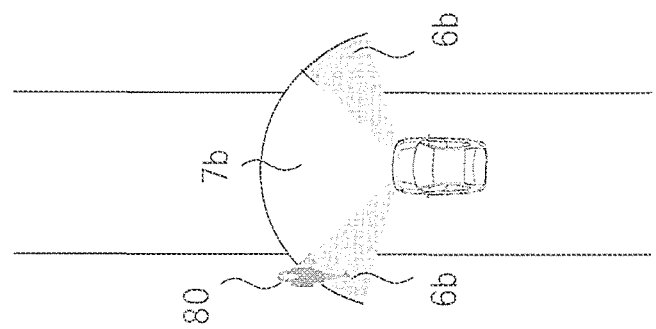
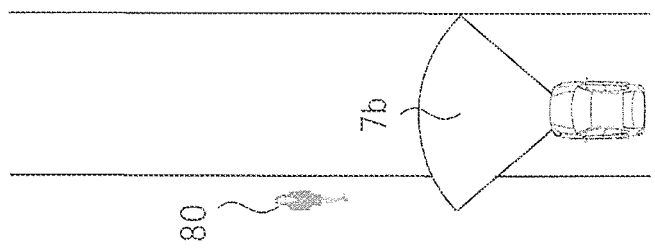

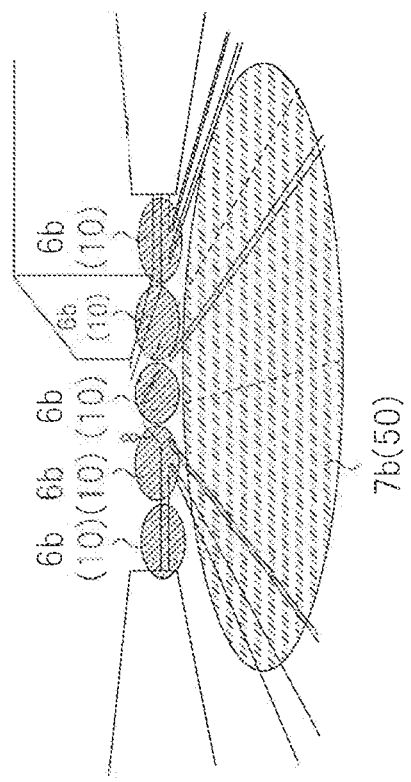
FIG. 14A
FIG. 14B
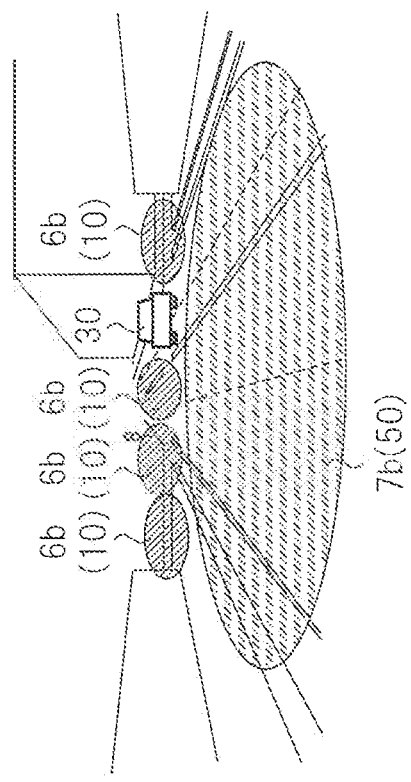
FIG. 14C
FIG. 14D

IN-VEHICLE HEADLIGHT AND LIGHT PROJECTION METHOD

CROSS REFERENCE

This application is a Continuation of U.S. patent application Ser. No. 17/406,728, filed Aug. 19, 2021, which is a continuation of U.S. patent application Ser. No. 16/498,250, filed Sep. 26, 2019, now U.S. Pat. No. 11,118,750 issued on Sep. 14, 2021, which is the U.S. National Phase under 35 U.S.C. § 371 of International Application No. PCT/JP2017/012661, filed on Mar. 28, 2017, the entire contents is hereby incorporated by reference.

TECHNICAL FIELD

The present invention relates to an in-vehicle headlight and a light projection method, particularly, a technique that mounts a laser light source and a spatial light modulator and is effective in controlling light distribution using holography principle.

BACKGROUND ART

For example, a halogen lamp and an HID (High-Intensity Discharge) lamp, etc. have been widely used as light sources for in-vehicle headlamps. Meanwhile, movement to introduce semiconductor light sources recently increases from advantages of having longer lifetimes and faster lighting/extinction start-up than such light sources.

A laser light beam among the semiconductor light sources has high directivity and can easily forma spot beam with high luminance, so that laser light sources have begun to be used as light sources for the in-vehicle headlamps from the viewpoint of improving visibility. For example, Patent Document 1 discloses "The vehicular lighting fixture 100 of the present embodiment is applied to a headlamp or a fog lamp of a vehicle such as an automobile or a motorcycle, and includes a light emitting unit 10, a laser optical system 20, a projection lens 30, and the like."

Additionally, consideration for avoidance of glare's occurrence to other vehicles needs to be made in improving visibility. As an example, an Adaptive Driving Beam (ADB) is proposed and begin to be put to practical use, the Adaptive Driving Beam adaptively controlling light distribution states for avoiding glare's occurrence to forward vehicles and oncoming vehicles while always brightly illuminating a visual field of a driver based on high-beam irradiation.

Particularly, the in-vehicle headlamps using the laser light sources are increasingly concerned about the glare's occurrence to the oncoming vehicles and the preceding vehicles as illuminance is made high, so that adaptively controlling the light distribution states is important.

For example, Patent Document 2 discloses, as a technique for controlling light distribution patterns of in-vehicle headlamps using laser light sources, "By controlling lighting intensity of light sources and inclinations of mirror members to scan, on a phosphor panel, light emitted from the light sources and reflected onto the mirror members in the form of predetermined scanning patterns, visible light beams distributed in shapes and light intensity corresponding to those scanning patterns are emitted from the phosphor panel and are projected in front of the vehicle by a projection lens. Namely, formed are the light distribution patterns corresponding to the scanning patterns on the phosphor panel. Such formation makes it possible to freely change the light distribution patterns only by varying the lighting intensity of the light sources and the inclinations of the mirror members without needing to provide many light emitting units (light sources) similarly to conventional ones.

RELATED ART DOCUMENTS

Patent Documents

Patent Document 1: Japanese Patent Application Laid-open No. 2011-198560
Patent Document 2: Japanese Patent Application Laid-open No. 2011-222238

SUMMARY OF THE INVENTION

Problems to be Solved by the Invention

The in-vehicle headlights are security parts whose equipment is required by law to ensure safety, and demand high reliability over a long period of time. Patent Document 2 described above uses a mechanical mechanism(s) to cause the inclination of the mirror member to change, thereby changing the light distribution patterns. However, when operations by the mechanical mechanism are repeated for a long period of time, abrasion and/or consumption of mechanical parts may occur to no small degree. Consequently, arises a problem of concern about malfunctions associated with such abrasion occurrence.

In the in-vehicle headlight that requires high reliability, it is desirable that the light distribution patterns can be changed by a solid-state component(s) without providing a movable part(s) using a mechanical mechanism as much as possible.

An object of the present invention is to provide, without using a mechanical configuration(s), a technique capable of improving reliability of an in-vehicle headlight by changing light distribution patterns.

The above and other objects and novel characteristics of the present invention will be apparent from the description of the present specification and the accompanying drawings.

Means for Solving the Problems

The following is a brief description of an outline of the typical invention disclosed in the present application.

Namely, a typical in-vehicle headlight includes a laser light source, a spatial light modulator, a controller, and a projection lens. The laser light source emits a laser light beam(s). The spatial light modulator modulates a phase distribution(s) of the laser light beam emitted by the laser light source. The controller controls the spatial light modulator. The projection lens projects emission light of the spatial light modulator.

Then, the controller controls the spatial light modulator so as to modulate the phase distribution of the laser light beam, and change a light distribution pattern(s) projected from the projection lens.

Further, the in-vehicle headlight is provided between the spatial light modulator and the projection lens, and has a phosphor that radiates fluorescence by the laser beam being irradiated. The projection lens projects a light beam generated by mixing the laser light beam and the fluorescence radiated by the phosphor.

Effects of the Invention

The effects obtained by typical embodiments of the invention disclosed in the present application will be briefly described below.

The reliability of the headlight can be improved.

BRIEF DESCRIPTIONS OF THE DRAWINGS

FIG. 12A and FIG. 12B are explanatory drawings showing a concrete example of the light distribution pattern of FIG. 11;

FIG. 13A and FIG. 13B are explanatory drawings showings another example of the light distribution pattern of FIG. 12;

FIGS. 14A-14D are explanatory drawings showing examples of an irradiation pattern and a light distribution pattern on a phosphor which a headlight according to a fourth embodiment has.

DETAILED DESCRIPTION OF PREFERRED EMBODIMENTS

Figure 1:
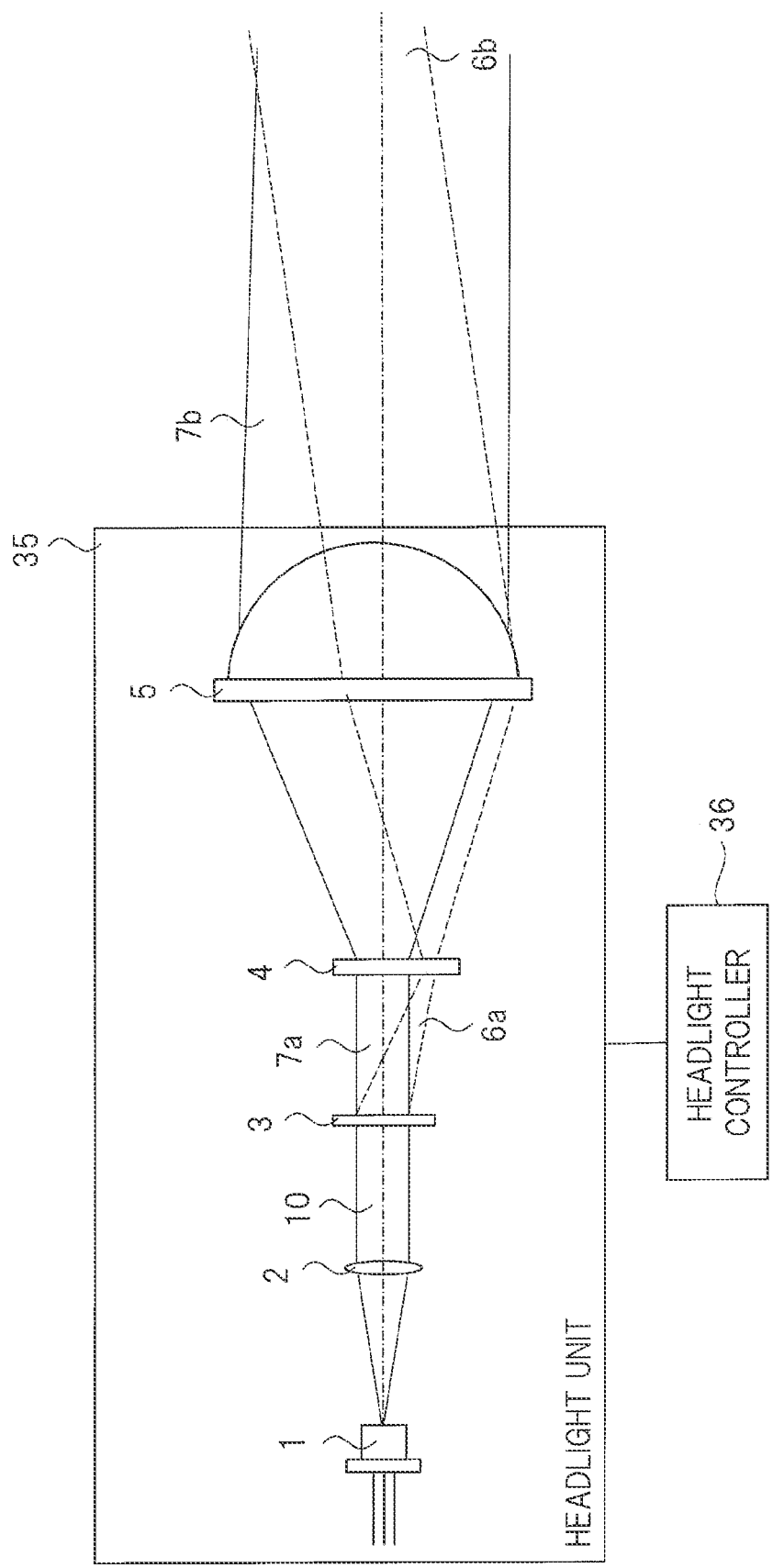
FIG. 1 is a schematic explanatory diagram showing an example of an optical system in a headlight according to a first embodiment.

Components having the same function are denoted by the same reference characters throughout the drawings for describing the embodiments, and the repetitive description thereof will be omitted. Hatching may be used even in a plan view so as to make the drawings easy to see.

First Embodiment

Figure 2:
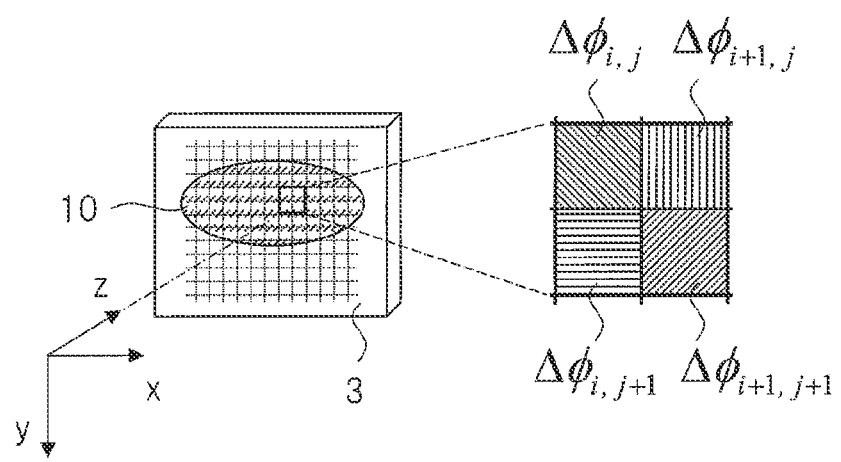
FIG. 2 is an explanatory drawing showing an example in which a phase is added for every pixel of a spatial light modulator, the headlight of FIG. 1 having the spatial light modulator.

Hereinafter, an embodiment will be described in detail.
<Configuration Example of In-Vehicle Headlight>
FIG. 1 is a schematic explanatory diagram showing an example of an optical system in a headlight according to the present first embodiment. FIG. 2 is an explanatory diagram showing an example in which a phase is added for each pixel of a spatial light modulator, the headlight of FIG. 1 having the spatial light modulator. FIG. 3 is an explanatory diagram showing an example in which an optical phase is modulated by the spatial light modulator of FIG. 2.

The headlight means an in-vehicle headlight mounted on an automobile or the like and, as shown in FIG. 1, includes a headlight unit 35 and a headlight controller 36. The headlight unit 35 includes a laser light source 1, a lens 2, a spatial light modulator 3, a phosphor 4, and a projection lens 5.

The headlight controller 36 generates various light distribution patterns by controlling an irradiation pattern(s) of the headlight unit 35. Incidentally, a configuration of the headlight controller 36 will be described later with reference to FIG. 7.

In FIG. 1, for example, the laser light source 1 is a laser light source that emits a blue laser light beam, and a laser light beam(s) 10 emitted from the laser light source 1 is incident on the spatial light modulator 3 via the lens 2.

For example, as shown in FIG. 2, the spatial light modulator 3 is a phase-modulation type spatial light modulator that has a plurality of pixels arranged two-dimensionally and modulates a phase of the incident laser light beam 10 for each pixel. The phase is added to each pixel. For example, a phase of $\Delta\phi_{i,j}$ is added to a pixel of $(i, j)$ as shown in FIG. 2.

Figure 3A:
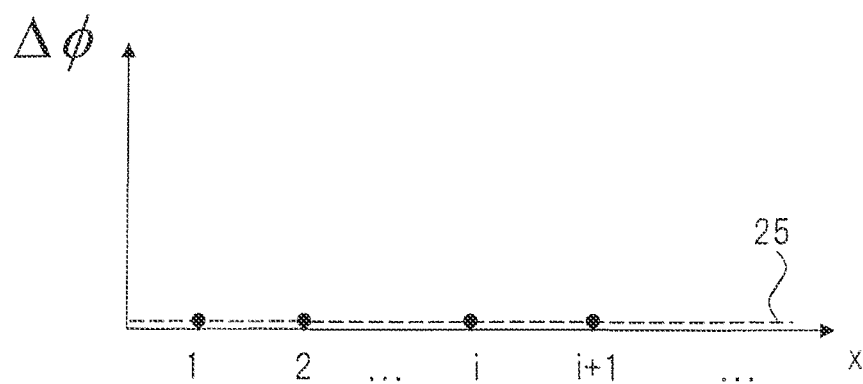
FIG. 3A and FIG. 3B are explanatory drawings shows an example in which an optical phase is modulated by the spatial light modulator of FIG. 2.
Figure 3B:
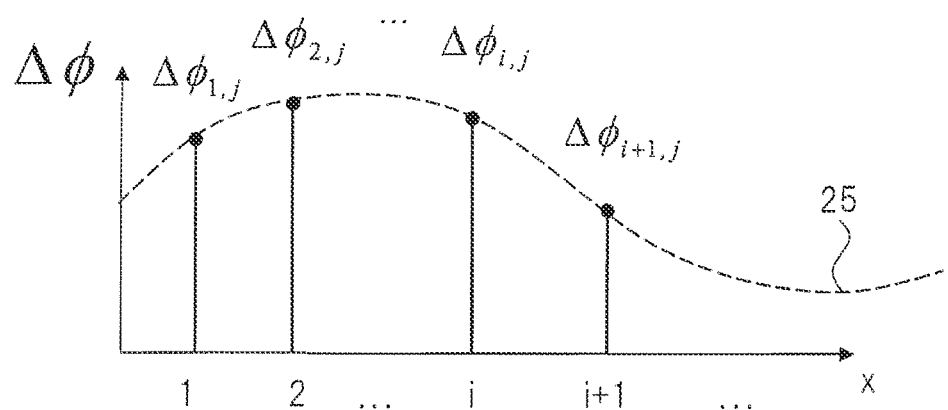

FIG. 3A represents a state before adding the phase to each pixel, and if a wavefront of an incidence light beam is flat, a wavefront 25 of an emission light beam remains flat. Meanwhile, as shown in FIG. 3B, a wavefront 25 of each laser light beam 10 can be transformed (converted) into a desired shape by adding a predetermined phase to each pixel.

Since a light beam(s) propagates in a direction perpendicular to a wavefront, control of a wavefront shape makes it possible to control light's propagation characteristics. As a result, an irradiation pattern of a light beam separating a predetermined distance therefrom can be controlled to have a desired shape.

Incidentally, a phase amount to be added to each pixel is adjusted by, for example, control etc. of a voltage to each pixel. Used as the spatial light modulator 3 is a liquid-crystal type spatial light modulator in which: liquid crystals of several hundred to several thousand per side are arranged as a two-dimensional pixel; a voltage is controlled for each pixel; and a phase is modulated by varying orientations of liquid crystal molecules in accordance with the controlled voltage.

Incidentally, an optical system of the headlight unit 35 may have a configuration using a reflection type spatial light modulator 3.

Figure 4:
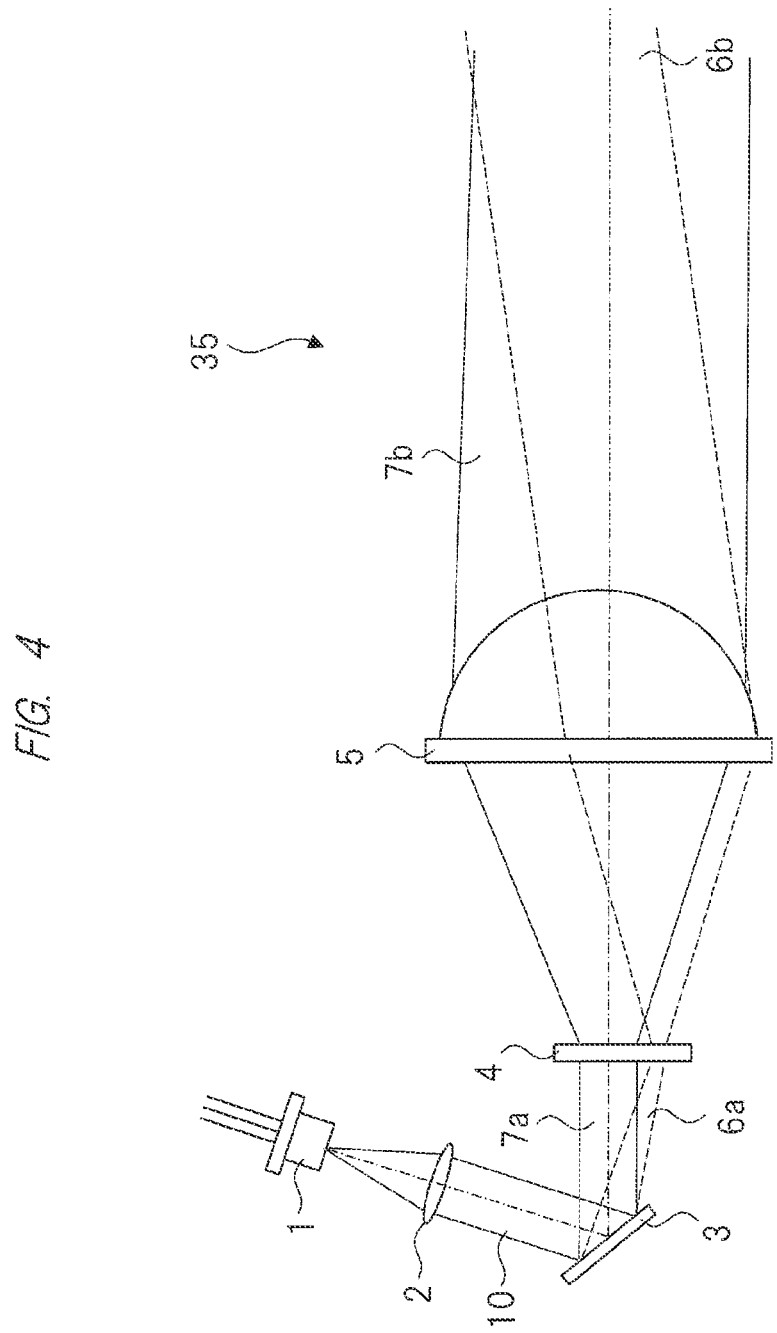
FIG. 4 is an explanatory drawing showing an example of a configuration of a headlight unit using a reflection type spatial light modulator.

FIG. 4 is an explanatory diagram showing an example of a configuration of a headlight unit using a reflection type spatial light modulator.

In this case, as shown in FIG. 4, used as the reflection type spatial light modulator 3 is a spatial light modulator, in which fine structures of several hundred to several thousand per side are arranged as a two-dimensional pixel on a silicon substrate and the structure corresponding to each pixel moves perpendicularly to a surface to modulate a phase of a predetermined pixel, similarly to a Planar Light Valve manufactured by Silicon Light Machines. Alternatively, used is a spatial light modulator called LCOS (Liquid Crystal On Silicon) in which liquid crystals are arranged (aligned) on a silicon substrate.

Thus, the spatial light modulator 3 is a solid-state modulator capable of phase modulation without providing a mechanical mechanism(s). Such a modulator brings no occurrence of abrasion and consumption etc. of the mechanical parts, and makes it possible to reduce occurrence of malfunctions etc. of the headlight in accordance with no abrasion occurrence.

In FIG. 1, the laser light beams 10 are separated into a diffracted beam 6a and a 0th order diffracted beam 7a by the phase modulation of the spatial light modulator 3. Here, the 0th order diffracted beam means a beam transmitted, as it is, without being subjected to phase modulation in a case of a transmission type spatial light modulator. Additionally, in a case of a reflection type spatial light modulator, the 0th order diffracted beam means a beam reflected, as it is, without being subjected to phase modulation. Incidentally, the laser light beams 10 incident on the spatial light modulator 3 are not limited to parallel light beams, and may be convergent light beams or divergent light beams.

Blue laser light beams separated into the diffracted beam 6a and the 0th order diffracted beam 7a are irradiated to the phosphor 4 with predetermined irradiation patterns, and a spot(s) subjected to this irradiation is excited. For example, fluorescence having a yellow spectrum occurs from the excited spot.

Part of the diffracted beam 6a and part of the 0th order diffracted beam 7a pass through the phosphor 4, and a mixture of those laser beams and the fluorescence occurring from the phosphor 4 becomes a white light beam. The white light beam is used as a headlight, and is projected in front of the headlight through the projection lens 5.

Here, for convenience, a white light beam generated by the diffracted beam 6a is abbreviated as a white beam 6b, and a white light beam generated by the 0th order diffracted beam 7a is abbreviated as a white beam 7b.

Since the excited spot on the phosphor 4 becomes a source for generating white beams, irradiation patterns with which the diffracted beam 6a and 0th order diffracted beam 7a exciting the phosphor 4 are irradiated onto the phosphor 4 can be virtually regarded as light source shapes of the white beams.

In FIG. 1, the phosphor 4 is disposed at, for example, an approximate back focus position of the projection lens 5, so that the irradiation patterns of the diffracted beam 6a and 0th order diffracted beam 7a that are irradiated onto the phosphor 4 virtually correspond to a shape of a white light source, and this shape is projected in front of the headlight through the projection lens 5.

Namely, changing the irradiation patterns of the diffracted beam 6a and 0th order diffracted beam 7a that are irradiated onto the phosphor 4 makes it possible to change the light distribution pattern projected in front of the headlight.

Incidentally, although disposing the phosphor 4 at the approximate back focus position of the projection lens 5 is described, a case where the projection lens 5 is a single lens may cause large field curvature. In order that the irradiation pattern irradiated onto the phosphor 4 is clearly projected in front of the headlight through the projection lens 5, the phosphor 4 desirably has a curved shape following (depending on) the field curvature, but not a planar shape.

Therefore, for example, adopted may be a configuration in which the phosphor 4 is made no a planar shape but a curved shape and the diffracted beam 6a and the 0th order diffracted beam 7a are irradiated onto the phosphor having the curved shape.

Additionally, in FIG. 1, all components in an optical system configuration of the headlight unit 35 use transmission type optical components. However, the optical system configuration of the headlight unit 35 is not limited to a transmission type optical system configuration, and may be a reflection type optical system configuration using, for example, a reflection type modulator as the spatial light modulator 3. Alternatively, it may be a reflection type optical system configuration by the phosphor 4 being also combined with a reflector.

<Example of Light Distribution Patterns>

Figure 5A:
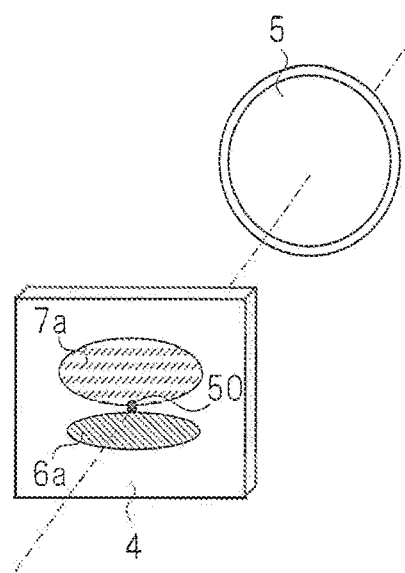
FIG. 5A and FIG. 5B are explanatory drawings showing examples of an irradiation pattern and a light distribution pattern on a phosphor which the headlight of FIG. 1 has.
Figure 5B:
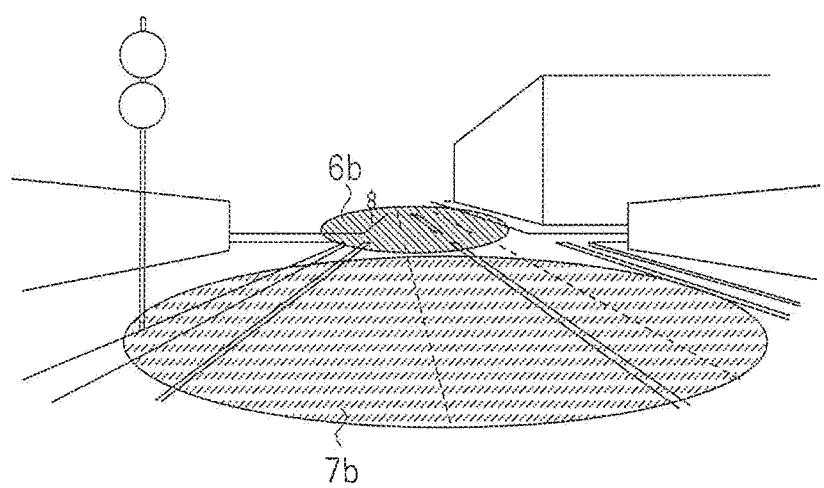

FIGS. 5A and 5B are explanatory diagrams showing examples of an irradiation pattern and a light distribution pattern on the phosphor that the headlight of FIG. 1 has.

FIG. 5A shows irradiation patterns of the diffracted beam 6a and 0th order diffracted beam 7a that are irradiated on the phosphor 4, and FIG. 5B shows light distribution patterns of the white beam 6b and white beam 7b that are projected in front of the headlight through the projection lens 5.

Incidentally, although FIG. 5A indicates that each of the irradiation pattern of the diffracted beam 6a and 0th order diffracted beam 7a has an elliptical shape. However, this irradiation pattern is not limited to the elliptical shape, and may have another shape in accordance with that of the light distribution pattern of the headlight. At this time, some optical components for shaping in advance the shapes of the laser light beams 10 incident on the spatial light modulator 3 may be separately mounted so that the 0th order diffracted beam 7a has a predetermined shape.

For example, as shown in FIG. 5A, when the diffracted beam 6a is irradiated onto the phosphor 4 and on a lower side in a direction vertical to the 0th order diffracted beam 7a, the irradiation pattern on the phosphor 4 is projected so that its image(s) is inverted to an intersection 50 between an optical axis of the projection lens 5 and the 0th diffraction beam 7a.

As shown in FIG. 5B, the white beam 6b generated by the diffracted beam 6a leads to being irradiated vertically above, i.e., farther than the white beam 7b generated by the 0th order diffracted beam 7a.

Figure 6A:
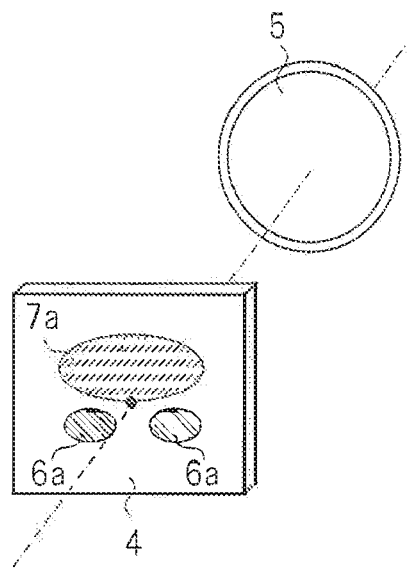
FIG. 6A and FIG. 6B are explanatory drawings showing another example of FIG. 5.
Figure 6B:
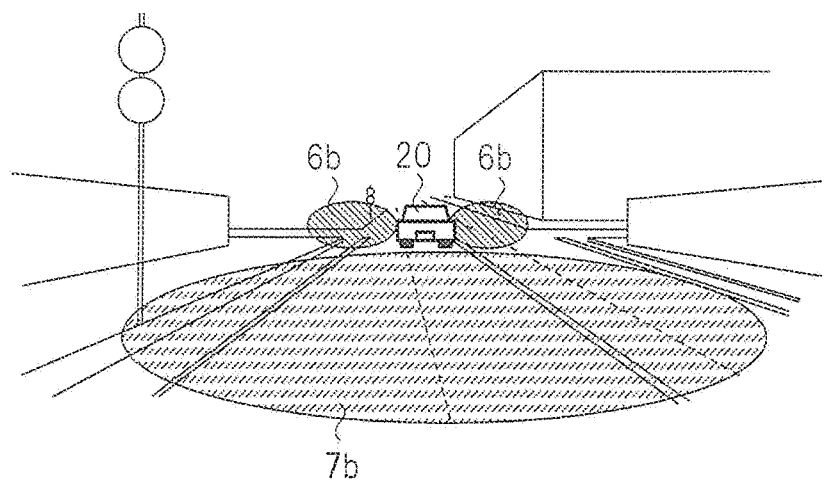

FIGS. 6A and 6B are explanatory diagrams showing another example of FIGS. 5A and 5B. FIG. 6A shows another irradiation pattern example of FIG. 5A, and FIG. 6B shows other light distribution pattern examples of the white beam 6b and white beam 7b that are projected in front of the headlight of FIG. 5B.

For example, as shown in FIG. 6A, by adjusting the phase modulation by the spatial light modulator 3, the irradiation pattern on the phosphor 4 can be changed to some irradiation patterns obtained by dividing the diffracted beam 6a.

When the irradiation pattern on the phosphor 4 is changed from FIG. 5A to, for example, FIG. 6A, a light distribution pattern(s) avoiding occurrence of glare to a preceding vehicle 20 in front of the headlight can be realized as shown in FIG. 6B.

As described above, the spatial light modulator 3 has the plurality of pixels arranged two-dimensionally, and can modulate the phase of the incident laser light beam for each pixel. That is, by adding an appropriate phase difference to each pixel, the spatial light modulator 3 serves as a phase hologram that generates desired 0th order diffracted beam and diffracted beam.

Therefore, use of the holography principle makes it possible to change irradiation amounts and irradiation patterns of the diffracted beam 6a and 0th order diffracted beam 7a that are irradiated onto the phosphor 4.

A phase distribution(s) added to the laser light beams by the spatial light modulator 3 is previously calculated as a phase distribution(s) to be added by the spatial light modulator 3 by, for example, an Iterative Fourier Transform Algorithm used in a field of a CGH (Computer-generated Hologram) so that the diffracted beam 6a and the 0th order diffracted beam 7a have desired irradiation patterns and irradiation amounts on the phosphor 4.

Then, based on the calculated phase distribution, the phases of the laser light beams incident on the spatial light modulator 3 are modulated for each pixel. At this time, in consideration of an initial phase distribution of the laser light beams incident on the spatial light modulator 3, the spatial light modulator 3 may add, to the laser light beams, a distribution(s) obtained by subtracting the above-mentioned initial phase distribution from the calculated phase distribution.

Timing for changing the irradiation pattern may be changed in cooperation with, for example, a driver's switch operation etc., or may be changed adaptively in accordance with an environment (surrounding situation) photographed by an in-vehicle camera etc. installed in the vehicle.

Figure 7:
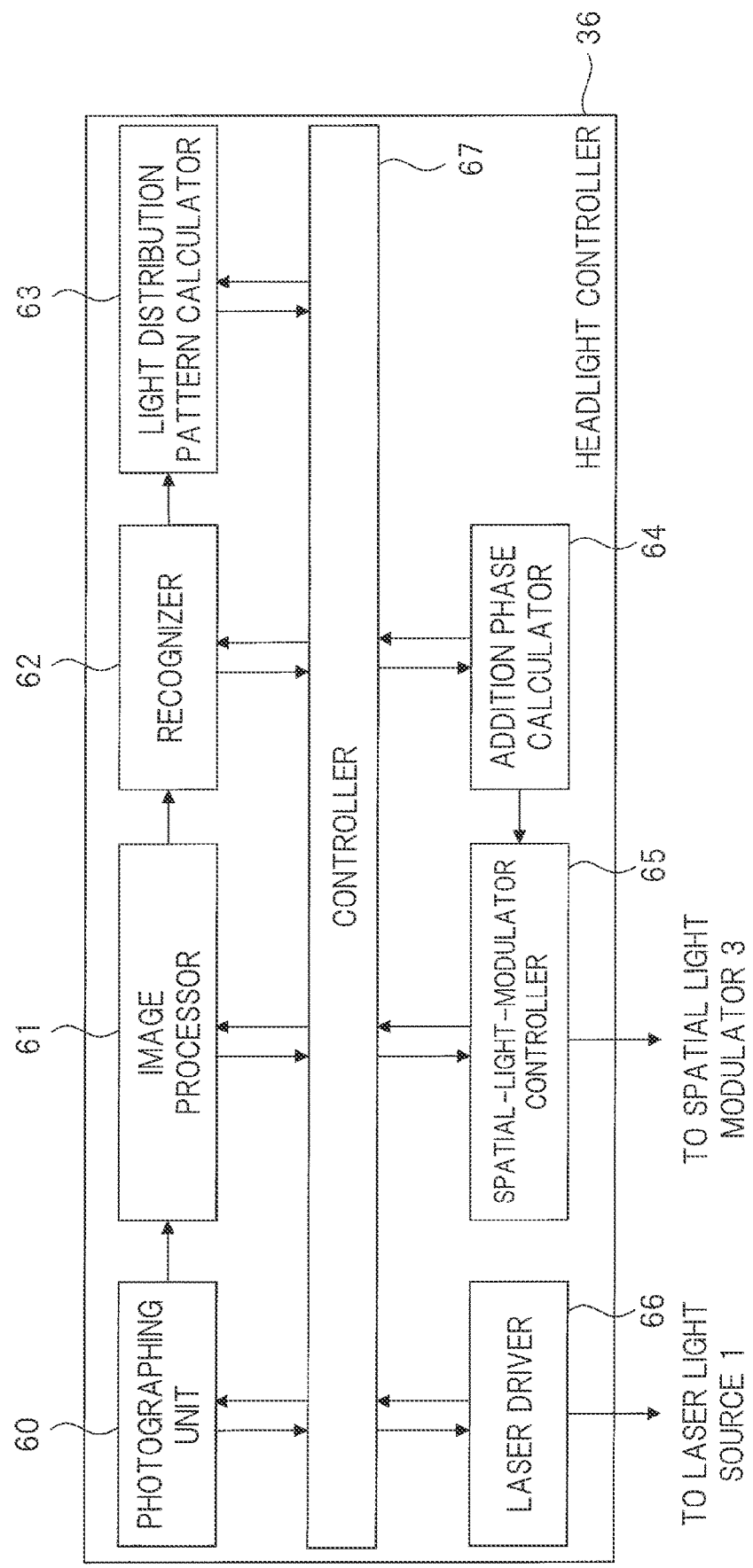
FIG. 7 is an explanatory drawing showing an example of a configuration of a headlight controller which the headlight of FIG. 1 has.

FIG. 7 is an explanatory diagram showing an example of a configuration of a headlight controller that the headlight of FIG. 1 has.

The headlight controller 36 controls alight distribution(s) of the headlight unit 35 in cooperation with the above-described in-vehicle camera etc. The headlight controller 36 includes a photographing unit (camera) 60, an image processor 61, a recognizer (recognition unit) 62, a light distribution pattern calculator 63, an addition phase calculator 64, a spatial-light-modulator controller 65, a laser drive controller 66, and a controller 67.

The controller 67 controls respective operations of the photographing unit 60, the image processor 61, the recognizer 62, the light distribution pattern calculator 63, the additional phase calculator 64, the spatial light modulator controller 65, and the laser drive controller.

Based on the control by the controller 67, the laser drive controller 66 drives the laser light source 1 included in the headlight unit 35 of FIG. 1, and controls intensity of the laser light beams emitted from the laser light source 1.

Information photographed by the photographing unit 60 installed in the vehicle, i.e., by an in-vehicle camera is appropriately subjected to an image processing(s) by the image processor 61, and is sent to the recognizer 62. The recognizer 62 recognizes, for example, a forward vehicle(s), an oncoming vehicle(s), a pedestrian(s), a road sign(s), and traffic lights, etc.

The light distribution pattern calculator 63 calculates, for example, a light distribution pattern(s) etc. avoiding occurrence of glare based on those pieces of recognition information. Additionally, the light distribution pattern is not limited to avoiding the glare's occurrence and, for example, a light distribution pattern(s), which is positively irradiated to the pedestrian, road sign, or the like recognized by the recognizer 62, may be calculated.

The light distribution pattern calculator 63 calculates an appropriate light distribution pattern(s) in accordance with the environment. The addition phase calculator 64 calculates, by using the above-described Iterative Fourier Transform Algorithm or the like, the phase distribution added by the spatial light modulator 3 based on the information calculated by the light distribution pattern calculator 63.

Then, the spatial-light-modulator controller 65 serving as a controller controls the spatial light modulator 3 in the headlight unit 35 of FIG. 1 in accordance with the phase distribution calculated by the additional phase calculator 64, and causes the white beam(s) to be irradiated in front of the driver.

Here, the optical system configuration of the headlight unit 35 is not limited to that shown in FIG. 1, and may be another configuration.

<Another Configuration Example of Headlight>

Figure 8:
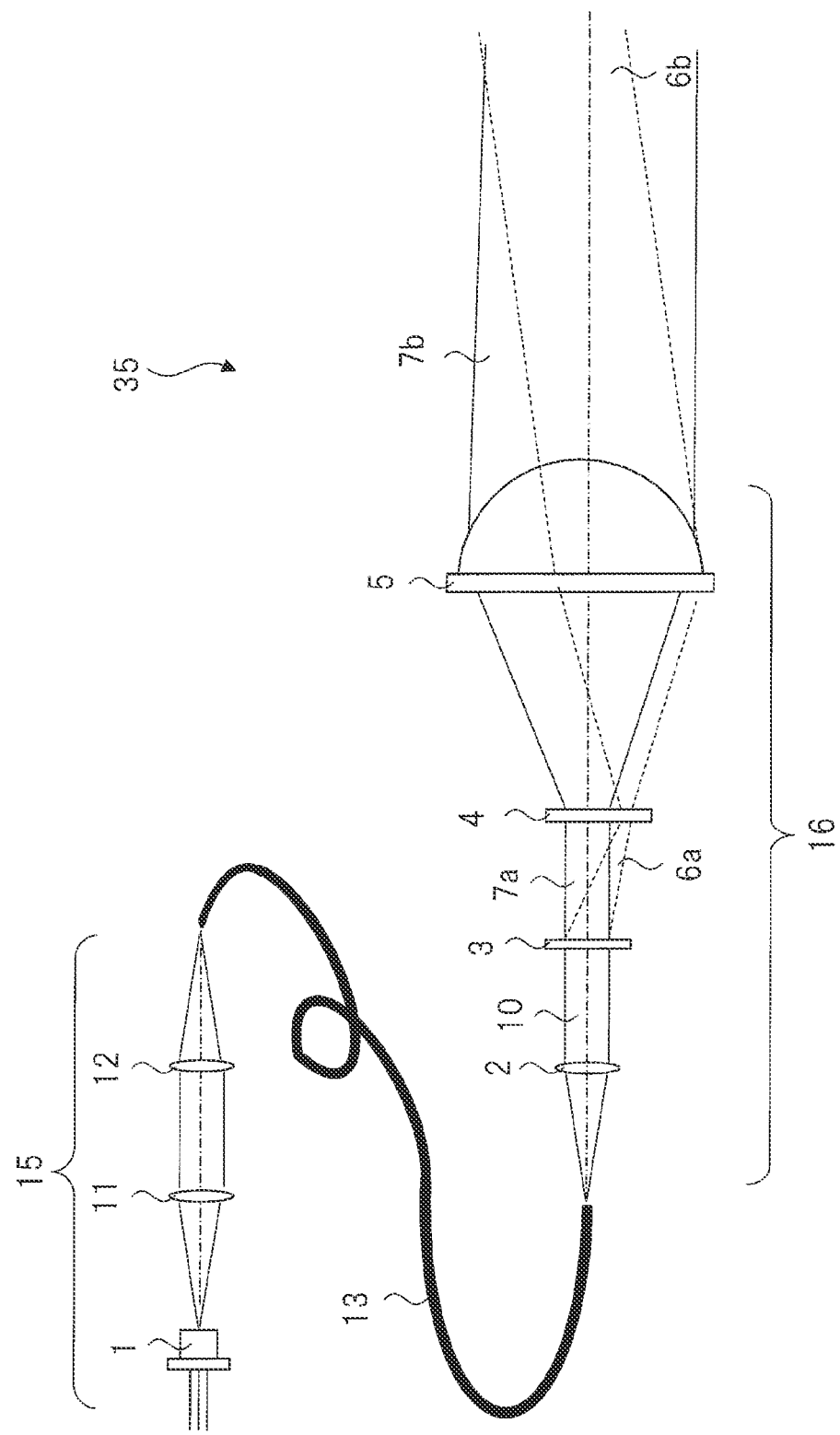
FIG. 8 is an explanatory drawing showing another configuration example of the headlight unit which the headlight of FIG. 1 has.

FIG. 8 is an explanatory diagram showing another configuration example of the headlight unit 35 of FIG. 1.

A headlight unit 35 shown in FIG. 8 is set so as to have a configuration in which a light source unit 15 and a projector 16 are separated through an optical fiber 13. The light source unit 15 includes the laser light source 1 and lenses 11, 12, and the projector 16 includes the lens 2, the spatial light modulator 3, the phosphor 4, and the projection lens 5.

The lenses 11, 12 are lenses that condense the laser light beam irradiated from the laser light source 1. The laser light beam condensed by the lenses 11, 12 is irradiated to the lens 2 through the optical fiber 13.

Since a configuration subsequent to the lens 2 is almost the same as that shown in FIG. 1, explanation of such a configuration will be omitted. Incidentally, FIG. 8 shows a configuration of having two lenses 11, 12. However, the number of lenses is not particularly limited, and another configuration example may have one lens or have three lenses or more as long as the lens or lenses condenses the laser light beams.

As shown in FIG. 8, adopting the configuration of separating the light source unit 15 and the projector 16 from each other through the optical fiber 13 makes it possible to increase a degree of freedom of installation of the light source unit 15. For example, the light source unit 15 can be installed not in a position close to an engine room where a temperature condition(s) is severe but in a vehicle which is milder in temperature environment than the engine room. This makes it possible to improve reliability of the headlight.

As described above, realized can be the headlight capable of arbitrarily controlling the light distribution pattern without providing any mechanical mechanisms. Realization of such a headlight makes it possible to improve the reliability of the headlight.

Second Embodiment

<Setting Example of Low Beam Area of 0th Order Diffracted Beam>

Described in a second embodiment will be a technique for setting a 0th order diffracted beam to a low beam area.

Figure 9:
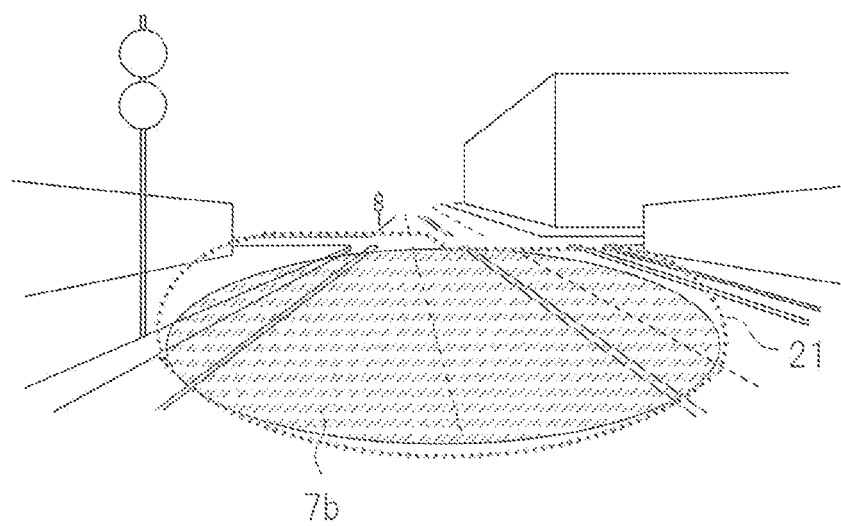
FIG. 9 is an explanatory drawing showing an example of a light distribution pattern which a headlight according to a second embodiment irradiates.

FIG. 9 is an explanatory diagram showing an example of a light distribution pattern irradiated by a headlight according to a second embodiment. FIG. 10 is an explanatory diagram showing another example of the light distribution pattern of FIG. 9.

The light distribution pattern by the second embodiment has, as shown in FIG. 9, a feature of holding (maintaining) an irradiation area of a white beam 7b within a region 21 irradiated by a low-beam headlight (hereinafter, called a "low beam" for convenience), the white beam 7b being generated by the 0th order diffracted beam 7a. Incidentally, a schematic diagram of an optical system of the headlight is almost the same as that shown in FIG. 1, and so its explanation will be omitted.

Namely, the white beam 7b generated by the 0th order diffracted beam 7a is used as the low beam. In order to hold the irradiation area of the white beam 7b within the region 21, for example, such an aperture stop(s) that an incident shape of the laser light beam incident on the spatial light modulator 3 of FIG. 1 has a desired shape may be disposed in an optical path(s).

Figure 10A:
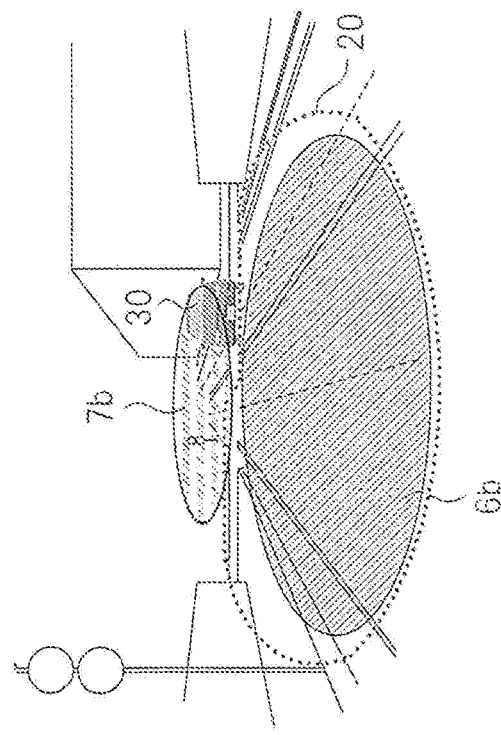
FIG. 10A and FIG. 10B are explanatory drawings showing another example of the light distribution pattern of FIG. 9.

A light distribution of the low beam is a light distribution obtained by considering occurrence avoidance of glare to the forward vehicles and oncoming vehicles, so that no problem of the glare arises even if the low beam is always lighted up. Meanwhile, if the light distribution of the white beam 7b generated by the 0th order diffracted beam exceeds the region 21 irradiated by the low beam as shown in FIG. 10(a) and can irradiate an inside of a region irradiated by a headlight for travel (hereinafter, called a "high beam" for convenience), the phase modulation by the spatial light modulator 3 needs to be set so as to make the 0th order diffracted beam as small as possible when necessity of avoiding the glare to the forward or oncoming vehicles occurs. In other words, diffraction efficiency of the laser light beams incident on the spatial light modulator 3 needs to be almost 100%.

However, a desired phase distribution may not be generally added faithfully to the laser light beams due to an influence of a quantization error(s) etc. associated with a pixel gap(s) and a gradation number(s) of the phase modulation of the spatial light modulator. To be unable to add a desired phase distribution(s) brings deterioration (reduction) in the diffraction efficiency, which may make a value of intensity of the 0th order diffracted beam larger than an assumed value(s).

Figure 10B:
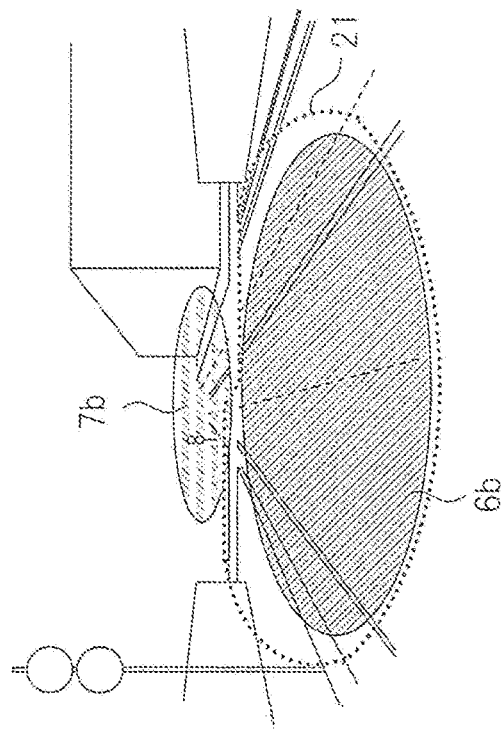

For this reason, even if the phase modulation is performed by the spatial light modulator 3 so as to make the 0th order diffracted beam as small as possible, for example, there arises a case of being unable to ignore intensity of an unnecessary 0th order diffracted beam as shown in FIG. 10(b), which causes the white beam 7b generated by the 0th order diffracted beam to be irradiated to the oncoming vehicle 30 and the forward vehicle and, consequently, the glare may occur.

Therefore, even if the value of the intensity of the 0th order diffracted beam becomes larger than the assumed value, adopted is such a configuration that the irradiation area in which the white beam 7b generated by the 0th order diffracted beam 7a is irradiated is held within the irradiation region of the low beam so as to be capable of avoiding the problem about the glare.

By adopting such a configuration, a light beam(s) arriving in the high-beam irradiation region leads to being only the white beam 6b generated by the diffracted beam 6a. Therefore, in avoiding the glare to the forward vehicles or oncoming vehicles, the diffraction efficiency may be set to almost zero so that the diffracted beam 6a is not generated. This is possible by not performing the phase modulation by the spatial light modulator 3.

Adopting such a configuration is effective also from the viewpoint of functional safety in order that the white beam 7b generated by the 0th order diffracted beam 7a may be irradiated in the low-beam irradiation region even if the phase modulation cannot be performed due to a failure(s) of the spatial light modulator 3.

Incidentally, in FIGS. 6A and 6B, the irradiation area of the white beam 7b is smaller than the irradiation region 21 of the low beam. However, the present embodiment is not limited to this, and the white beam 7b may be irradiated so as to fill the entire region 21 therewith.

Further, luminance in the region to which the low beam is irradiated may be given by such a light distribution(s) that the luminance complies with luminance corresponding to each measurement point described in, for example, Section 6.2.4. etc. of the European law (ECE 112).

As described above, the reliability of the headlight can be further improved.

Third Embodiment

<Example of Control of Irradiation Angle>

In this third Embodiment, explained will be a control technique of irradiation angles about a headlight.

Figure 11A:
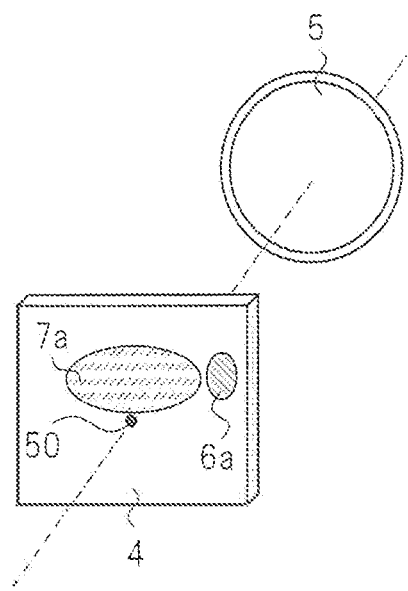
FIG. 11A and FIG. 11B are explanatory drawings showing examples of an irradiation pattern and a light distribution pattern on a phosphor which a headlight according to a third embodiment has.
Figure 11B:
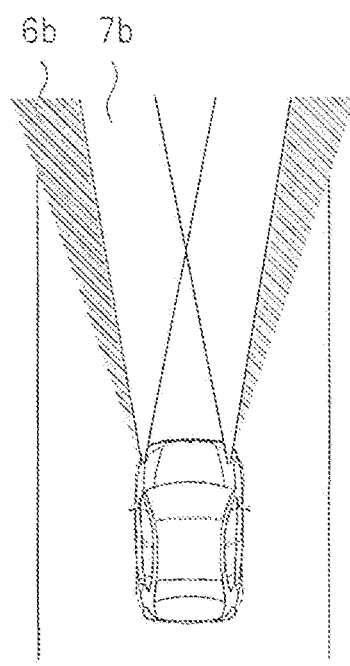

FIGS. 11A and 11B are explanatory diagrams showing examples of an irradiation pattern and a light distribution pattern on a phosphor that a headlight according to a thirty-third embodiment has.

Incidentally, a schematic diagram of the optical system of the headlight is almost the same as that shown in FIG. 1, and a difference therebetween is irradiation patterns of the diffracted beam 6a and the 0th order diffracted beam 7a that are irradiated to the phosphor 4 in FIG. 1.

FIG. 11A shows irradiation patterns of the diffracted beam 6a and the 0th order diffracted beam 7a that are irradiated onto the phosphor 4 in FIG. 1, and FIG. 11B shows light distribution patterns of the white beam 6b and the white beam 7b that are projected in front of the headlight through the projection lens 5 in FIG. 1.

In this case, the diffracted beam 6a is irradiated, on the phosphor 4, sideways in a direction horizontal to the 0th order diffracted beam 7a. That is, as shown in FIG. 11A, the diffracted beam 6a is irradiated on a right side of the 0th order diffracted beam 7a.

As described above, the irradiation pattern on the phosphor 4 is projected with the image being reversed to the intersection 50 with the optical axis of the projection lens 5. Therefore, as shown in FIG. 11B, the white beam 6b generated by the diffracted beam 6a is shifted, in front of the headlight, horizontally outward farther than the white beam 7b generated by the 0th order diffracted beam 7a, that is, is irradiated so as to extend (expand) a range of irradiation angles.

This makes it possible to bring an increase in light amounts in a wide range in a horizontal direction, and improve horizontal visibility of a driver.

Timing for extending an irradiation-angle range may be cooperated with, for example, a predetermined operation(s) of the driver, or be automatically set in accordance with an in-vehicle camera(s) installed in the vehicle, that is, in accordance with an environment(s) captured by the photographing unit 60 in FIG. 7.

FIGS. 12A and 12B are explanatory diagrams showing a concrete example of the light distribution pattern of FIGS. 11A and 11B.

FIG. 12A shows an irradiation state before the vehicle reaches a traffic intersection, and FIG. 12B shows, subsequently to FIG. 12A, a state of extending a horizontal irradiation area when the vehicle reaches the traffic intersection.

In FIG. 12A, the white beam 7b generated by the 0th order diffracted beam 7a is irradiated. Here, when the in-vehicle camera installed in the vehicle recognizes the traffic intersection and the vehicle reaches the traffic intersection, the white beam 6b generated by the diffracted beam 6a is irradiated and the horizontal irradiation area is extended as shown in FIG. 12B.

Such extension makes it possible to improve the visibility when the vehicle travels in the traffic intersection, and to easily recognize a pedestrian(s) etc.

Incidentally, the timing for extending the irradiation area may be extended (increased) in cooperation with a steering angle of a steering wheel when the steering angle of the steering wheel is equal to or larger than a predetermined angle.

FIGS. 13A and 13B are explanatory diagrams showing another example of the light distribution pattern of FIGS. 12A and 12B.

FIG. 13A shows an example of a light distribution pattern in a state where a pedestrian 80 is present on a side road and the vehicle is traveling in a direction of approaching the pedestrian. FIG. 13B has shown an example of the light distribution pattern when the camera recognizes the pedestrian on the side road.

When the vehicle is traveling as shown in FIG. 13A and the in-vehicle camera installed in the vehicle recognizes the pedestrian 80, the white beam 6b generated by the diffracted beam 6a is irradiated and, as shown in FIG. 13B, the horizontal irradiation area is extended. This makes it possible to improve visibility with respect to the pedestrian on the side road.

Incidentally, although FIGS. 11A and 11B show an example in which the white beam 6b generated by the diffracted beam 6a is irradiated sideways on the road, the irradiation pattern is not limited to this. For example, in order to positively irradiate a pedestrian(s) and a road sign(s), etc., the phase distribution added by the spatial light modulator 3 can be also changed so that the diffracted beam 6a is irradiated to a position on the corresponding phosphor 4.

As described above, safety can be enhanced while the reliability of the headlight is improved.

Fourth Embodiment

<Setting of Laser Intensity and Diffraction Efficiency>

A fourth Embodiment changes emission intensity of the laser light beams emitted from the laser light source 1 in accordance with a light distribution pattern(s) projected from the projection lens 5. Incidentally, the headlight is almost the same as that of the first embodiment shown in FIG. 1, and so its explanation will be omitted.

FIGS. 14A-14D are explanatory diagrams showing examples of an irradiation pattern and a light distribution pattern on a phosphor that a headlight according to the fourth embodiment has.

In this case, for example, as shown in FIG. 14A, irradiated onto the phosphor 4 are one 0th order diffracted beam 7a and five beam spots of a diffracted beam 6a below the 0th order diffracted beam 7a. Consequently, as shown in FIG. 14B, white beams 6b generated by these beam spots and a white beam 7b are projected in front of the headlight.

Incidentally, an irradiation pattern(s) irradiated onto the phosphor 4 is not limited to that of FIG. 14A, and each shape and the number of beam spots may be changed as the need arises.

Here, numerical values in parentheses adjacent to the reference numerals 6b, 7b shown in FIG. 14B indicate values corresponding to respective light amounts of the white beam 6b and the white beam 7b. Namely, the entire amount of light beams projected in front of the headlight leads to being projected as an amount of 100 obtained by summing the numerical values in parentheses.

Subsequently, for example, it is assumed that an oncoming vehicle 30 appears from a state shown in FIG. 14B and necessity to avoid glare to the oncoming vehicle 30 occurs. In this case, the headlight controller 36 changes the phase modulation by the spatial light modulator 3 to reduce, for example, one beam spot of the diffracted beam 6a on the phosphor 4 as shown in FIG. 14C and to irradiate four beam spots of the diffracted beam 6a.

At this time, if luminance of lighting areas other than an area extinguished to avoid the glare is changed, the driver feels uncomfortable. Therefore, it is desirable that the luminance of the respective lighting areas is kept substantially the same.

Thus, as shown in FIG. 14D, it is desirable that the respective light amounts of white beam 6b and white beam 7b are set to the same level as that of the light amounts in the respective areas shown in FIG. 14C. That is, in FIG. 14D, the entire amount of light beams projected in front of the headlight leads to being projected as an amount of 90 obtained by summing the numeral values in parentheses.

Therefore, if part of the area is extinguished (lighted off) to avoid the glare, the entire amount of light beams projected in front of the headlight can be reduced from 100 to 90. In other words, reduced can be the emission intensity of the laser light beams emitted from the laser light source 1.

The laser drive controller 66 reduces the emission intensity of the laser light beams emitted from the laser light source 1 when the light distribution pattern projected in front of the headlight is partially extinguished.

Further, if the diffraction efficiency is focused on, the entire light amount of white beams 6b generated by the diffracted beam 6a in the light distribution pattern shown in FIG. 14B is projected as an amount of 50 obtained by summing the numeral values in the parentheses.

Meanwhile, the total light amount of light beams projected in front of the headlight is projected as the amount of 100 as described above, so that diffraction efficiency can be estimated to be approximately 50% if vignetting and stray light of a light flux are ignored.

Similarly, when the diffraction efficiency is roughly estimated in the light distribution pattern shown in FIG. 14B, it is estimated as 44% from a relationship of the total light amount 90 with respect to the entire light amounts 40 of white beam 6b generated by the diffracted beam 6a.

Namely, partially extinguishing the light distribution pattern projected in front of the headlight makes it possible to reduce the emission intensity of the laser light beam emitted from the laser light source 1 as described above and to further reduce the diffraction efficiency.

A technique for reducing diffraction efficiency while a diffraction angle is held can be realized by, for example, in a case of a diffraction grating, changing depth of each grating groove, in other words, phase depth while its grating pitch is held.

In consideration of this, for example, in order to realize the irradiation pattern of the diffracted beam 6a with the maximum diffraction efficiency, the headlight controller 36 first calculates a phase distribution(s) required by the spatial light modulator 3 for the laser light beams through, for example, the Iterative Fourier Transform Algorithm etc.

Then, this calculation can be realized by the spatial light modulator 3 adding, to the laser light beams, a distribution in which the phase distribution is multiplied by a uniform correction coefficient α to change the phase depth. The correction coefficient α may be set appropriately in accordance with an amount of reduction in diffraction efficiency and, for example, setting the correction coefficient α to a value smaller than 1 makes it possible to reduce the diffraction efficiency.

Incidentally, each numerical value in the parentheses described in FIGS. 14A-14D are numerical values set for convenience of explanation, and each numerical value is not limited to those numerical values described in Figure.

Also by the above, the present embodiment can enhance safety while improving the reliability of the headlight.

Fifth Embodiment

<Generation of Infrared Light>

In a fifth embodiment, a headlight generating an infrared light beam will be described.

A semiconductor light source such as a laser has advantages of having longer lifetime and quicker lighting/extinction start-up than a halogen lamp etc. Meanwhile, the halogen lamp etc. have a feature of almost no spectral component in an infrared light region contained therein.

Infrared light plays an important role as a light source for night vision use applications that enhance night-time visibility. Therefore, the present embodiment mounts the laser light source 1 for generating a white beam(s) and, for example, needs to separately mount an infrared light source as a separate light source when infrared light is also required for the night vision use applications. An increase in the number of light sources affects increases in size and cost of an apparatus (devise), so that the number of light sources is desirably as small as possible.

Hereinafter, generation of infrared light by the headlight will be described.

Figure 15:
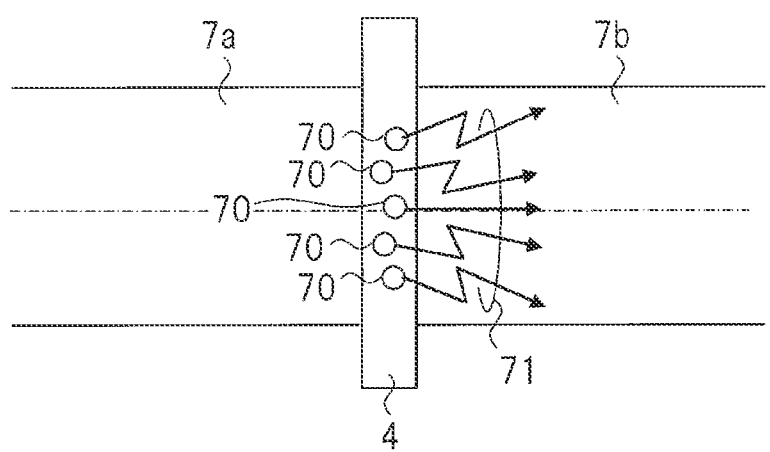
FIG. 15 is a schematic explanatory drawing of a phosphor which a headlight according to a fifth embodiment has.

FIG. 15 is a schematic explanatory diagram of a phosphor that a headlight according to the fifth embodiment has.

Incidentally, a configuration of the headlight is almost the same as that of FIG. 1 in the first embodiment, but a difference between the present embodiment and that of FIG. 1 is a configuration of a phosphor 4.

In this case, as shown in FIG. 15, the phosphor 4 is a phosphor 4 radiating a yellow spectrum as fluorescence by excitation of the blue laser described above, and is doped with fluorescent materials 70 each of which radiates fluorescence of infrared light. The phosphor 4 is a first fluorescent material, and the fluorescent material 70 is a second fluorescent material.

Incidentally, used as the fluorescent material is a material such as a quantum cutting phosphor which absorbs one high energy photon and emits two lower energy photons, so that use of such a material makes it possible to generate a fluorescent 71 in a range of a band of near infrared light from a wavelength band of a blue laser.

Adopting such a configuration as the phosphor 4 makes it possible to generate the fluorescence of yellow light and near infrared light while a single excitation light source and the phosphor 4 are used.

As described above, the present embodiment can generate the white beams and the near infrared light that are usable as an in-vehicle headlight with a simple configuration.

Additionally, when a divergence angle of fluorescence having a yellow spectrum generated from the phosphor 4 is different from a divergence angle of a blue laser that has passed through the phosphor 4, a region that is not partially mixed therewith and is made no white beam may occur. Therefore, for example, adopted may be such a configuration as to arrange an optical component(s) having wavelength selectivity immediately after the phosphor 4, widen the divergence angle of the blue laser, and approach the divergence angle of the fluorescence.

As described above, the present embodiment can enhance nighttime safety while improving the reliability of the headlight.

In the foregoing, the invention made by the inventor of the present invention has been concretely described based on the embodiments. However, needless to say, the present invention is not limited to the foregoing embodiments, and various modifications and alterations can be made within a range not departing from the gist of the present invention.

Note that the present invention is not limited to the embodiments described above and includes various modification examples. For examples, the embodiments above have been described in detail so as to make the present invention easily understood, and the present invention is not always limited to the embodiment having all of the described constituent elements.

Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

EXPLANATION OF SYMBOLS

1 Laser light source;
2 Lens;
3 Spatial light modulator;
4 Phosphor;
5 Projection lens;
11 Lens;
12 Lens;
13 Optical fiber;
15 Light source unit;
16 Projector;
35 Headlight unit;
36 Headlight controller;
60 Photographing unit;
61 Image processor;
62 Recognizer;
63 Light distribution pattern calculator;
64 Addition phase calculator;
65 Spatial-light-modulator controller;
66 Laser drive controller;
67 Controller;
70 Fluorescent material; and
71 Fluorescence.

The invention claimed is:

1. An in-vehicle headlight comprising:
a laser light source configured to emit a laser light beam;
a lens configured to receive and transmit through the laser light beam emitted from the laser light source;
a spatial light modulator configured to modulate a phase distribution of the laser light beam emitted from the laser light source and transmitted through the lens;
a controller configured to control the spatial light modulator;
a phosphor configured to radiate fluorescence by the laser light beam, and
a projection lens configured to project the laser light beam, emission light of the spatial light modulator and the fluorescence which are incident thereon,
wherein the controller controls the spatial light modulator so as to modulate the phase distribution of the laser light beam, and changes a light distribution pattern of the laser light beam projected from the projection lens,
wherein the phosphor is provided between the spatial light modulator and the projection lens,
wherein the projection lens projects a light beam generated by mixing the fluorescence radiated by the phosphor and the laser light beam,
wherein the controller controls the spatial light modulator so that an irradiation pattern of the laser light beam irradiated to the phosphor changes in changing the light distribution pattern, and the controller modulates the phase distribution of the laser light beam, wherein a diffracted beam and a 0th order diffracted beam are irradiated to the phosphor, the diffracted beam being generated by modulation of the phase distribution, the 0th order diffracted beam transmitting or being reflected by the spatial light modulator without being subjected to the modulation of the phase distribution, wherein the controller controls the spatial light modulator so that the irradiation pattern of the diffracted beam irradiated to the phosphor changes in changing the light distribution pattern, and the controller changes the phase distribution, wherein the light beam projected from the projection lens includes at least a first light beam and a second light beam, wherein the first light beam is generated by mixing the 0th order diffracted beam and the fluorescence generated by the 0th order diffracted beam being irradiated to the phosphor, wherein the first light beam based on the 0th order diffracted beam is used as a low-beam headlight, wherein the second light beam is generated by mixing the diffracted beam and the fluorescence generated by the diffracted beam being irradiated to the phosphor, and wherein the second light beam based on the diffracted beam is used as a high beam.

2. The in-vehicle headlight according to claim 1, wherein the spatial light modulator has a plurality of pixels arranged in an array, and is a transmission type of modulating a phase of the incident laser light beam for each of the pixels, and the controller adds the phase to each of the pixels to transform a wavefront shape of the laser light beam and to modulate the phase distribution of the laser light beam.

3. The in-vehicle headlight according to claim 1, wherein the spatial light modulator has a plurality of pixels arranged in an array, and is a reflection type of reflecting the incident laser light beam for each of the pixels to modulate a phase, and the controller controls an operation of each of the pixels to modulate the phase distribution of the laser light beam.

4. The in-vehicle headlight according to claim 1, further comprising a laser drive controller controlling emission intensity of the laser light beam emitted from the laser light source, wherein the laser drive controller changes the emission intensity of the laser light beam emitted from the laser light source in accordance with the light distribution pattern projected from the projection lens.

5. The in-vehicle headlight according to claim 1 further comprising:

a photographing unit configured to photograph a situation outside a vehicle;

an image processor configured to image-process photography information photographed by the photographing unit; and a recognizer configured to recognize the situation outside the vehicle based on an image processed result of the image processor, wherein the controller changes the light distribution pattern based on a recognition result recognized by the recognizer.

6. The in-vehicle headlight according to claim 1, wherein the phosphor has at least a first fluorescence material and a second fluorescence material, the first fluorescence material emits fluorescence having a yellow spectrum, and the second fluorescence material emits a spectrum of near infrared light.

7. A light projection method by an in-vehicle headlight using a laser light source to project a light beam, the method comprising:

emitting a laser light beam from the laser light source;

transmitting through the laser light beam emitted from the laser light source by a lens;

making the laser light beam and fluorescence incident on a projection lens, and projecting a light beam from the projection lens, wherein the laser light beam is incident on a phosphor, and the fluorescence is radiated from the phosphor; and modulating a phase distribution of the laser light beam transmitted through the lens by a spatial light modulator to change a light distribution pattern of the light beam projected by the projection lens, wherein projecting the light beam causes a light beam generated by mixing fluorescence and the laser light beam to be incident on the projection lens, wherein the fluorescence is generated by irradiating a phosphor with the laser light beam modulated by the spatial light modulator, wherein changing the light distribution pattern changes an irradiation pattern of the laser light beam irradiated to the phosphor to change the light distribution pattern projected from the projection lens, wherein a diffracted beam and a 0th order diffracted beam are irradiated to the phosphor, the diffracted beam being generated by modulation of the phase distribution, the 0th order diffracted beam transmitting or being reflected by the spatial light modulator without being subjected to the modulation of the phase distribution, wherein changing the light distribution pattern changes the phase distribution by the spatial light modulator to change the irradiation pattern of the diffracted beam irradiated to the phosphor, wherein the light beam projected from the projection lens includes at least a first light beam and a second light beam, wherein the first light beam is generated by mixing the 0th order diffracted beam and fluorescence generated by irradiating the 0th order diffracted beam to the phosphor, wherein the first light beam based on the 0th order diffracted beam is used as a low-beam headlight, wherein the second light beam is generated by mixing the diffracted beam and fluorescence generated by irradiating the diffracted beam to the phosphor, and wherein the second light beam based on the diffracted beam is used as a high beam.

8. The in-vehicle headlight according to claim 1, further comprising an aperture stop configured so that light incident on the spatial light modulator have a desired shape, wherein the first light beam generated by the 0th order diffracted beam is directed to an irradiation area of the low-beam headlight by the aperture stop.

* * * * *